July 27, 1965   C. V. FRENCH   3,197,536

METHOD OF MANUFACTURING ASBESTOS-CEMENT ARTICLES

Original Filed Aug. 4, 1959   2 Sheets-Sheet 1

INVENTOR.
CLAYTON V. FRENCH
BY
John A. McKinney
ATTORNEY

July 27, 1965 C. V. FRENCH 3,197,536
METHOD OF MANUFACTURING ASBESTOS-CEMENT ARTICLES
Original Filed Aug. 4, 1959 2 Sheets-Sheet 2
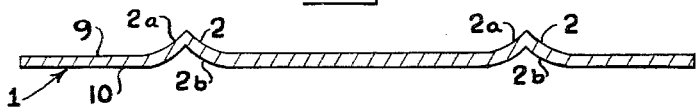
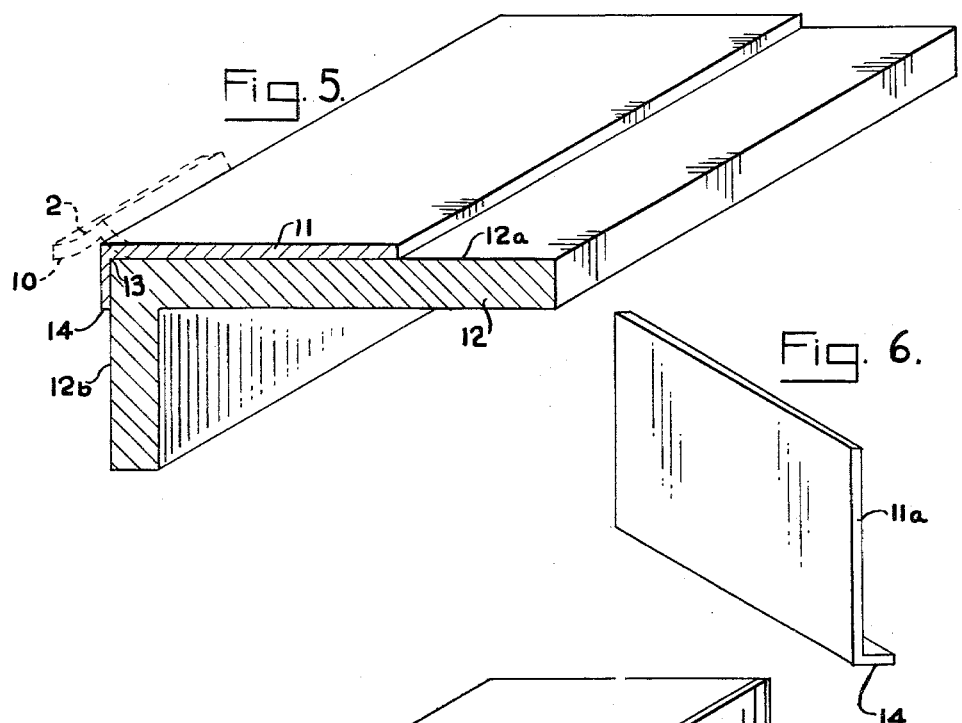
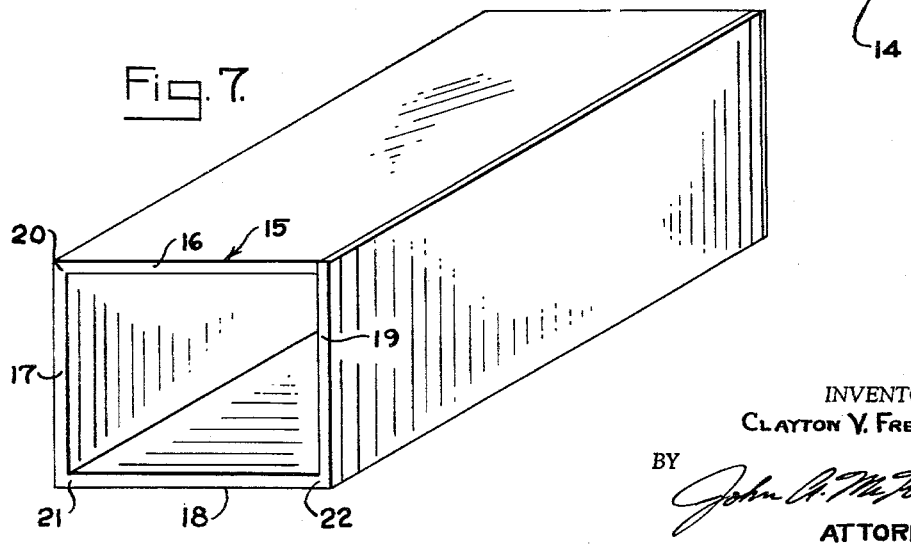
INVENTOR.
CLAYTON V. FRENCH
BY
ATTORNEY 3,197,536
METHOD OF MANUFACTURING ASBESTOS-CEMENT ARTICLES
Clayton V. French, Somerville, N.J., assignor to Johns-Manville Corporation, New York, N.Y., a corporation of New York
Continuation of application Ser. No. 831,633, Aug. 4, 1959. This application Feb. 26, 1962, Ser. No. 175,683
7 Claims. (Cl. 264—285)

This application is a continuation of Serial No. 831,633, now abandoned.

This invention relates to the manufacture of asbestos-cement products; more particularly, it relates to a method of forming sharp corners, irregular contours, and irregular cross-sectional shapes in asbestos-cement sheets.

Heretofore, it has been difficult to bend asbestos-cement sheets, while in the uncured or "green" stage, into shapes having sharp corners therein, since the sheets, during such sharp bending, have their surface integrity destroyed which ultimately results in noticeable cracks formed in the surfaces of the hardened sheets. Where such bends were desired to be made, they were usually restricted to bends having radii of approximately 1" or more. Formation of a ninety-degree turn or bend in an asbestos-cement sheet could only be made, for example, where the apices of the corners were of rounded form, limited to radii of 1" or more.

An object of this invention therefore is to provide a novel method of forming sharp cornered, right-angled bends in green asbestos-cement sheets, and the like, without creating marked imperfections adjacent the sharp corners and without appreciably weakening the sheets adjacent the corners.

An additional object of this invention is a novel method of forming sharp bends or turns in asbestos-cement sheets, while such sheets are in the uncured or green stage.

Still a further object of this invention is to provide a novel method of forming asbestos-cement sheets into irregular shapes, which shapes were very difficult to fabricate or produce in asbestos-cement sheets heretofore.

In brief, the invention comprises subjecting a flat, green, asbestos-cement sheet to the press action of an accumulator roll having a particular design on its peripheral surface, which imparts to the sheet a crimp or a plurality of crimps within the body portion thereof. The crimped sheet formed is subsequently superimposed over a die or form having a cross-sectional shape desired to be imparted to the sheet, wherein the crimp is placed adjacent a sharp bend or an irregular contour of the form, and the entire sheet is thereafter shaped to such form. The once planar sheet, after being shaped in this manner, can be removed from the form or die and is cured, either by air curing or by steam curing, thereby hardening the ingredients contained in the shaped sheet of material and producing a hardened article having a predetermined, cross-sectional shape with sharp bends or turns therein.

These and other objects will be readily apparent from the preceding brief description and from the following more detailed description and the accompanying drawings wherein:

FIG. 3 is a cross-sectional view of a sheet shaped by the apparatus of FIGS. 1 and 2 taken along lines 3—3 of FIG. 1;

FIG. 5 shows the molding of an asbestos-cement sheet on a die or form after such a sheet has been initially contoured by the accumulator roll of FIG. 1; and FIGS. 6 and 7 pictorially illustrate several of the various products which may be manufactured utilizing the precepts of this invention.

Figure 1:
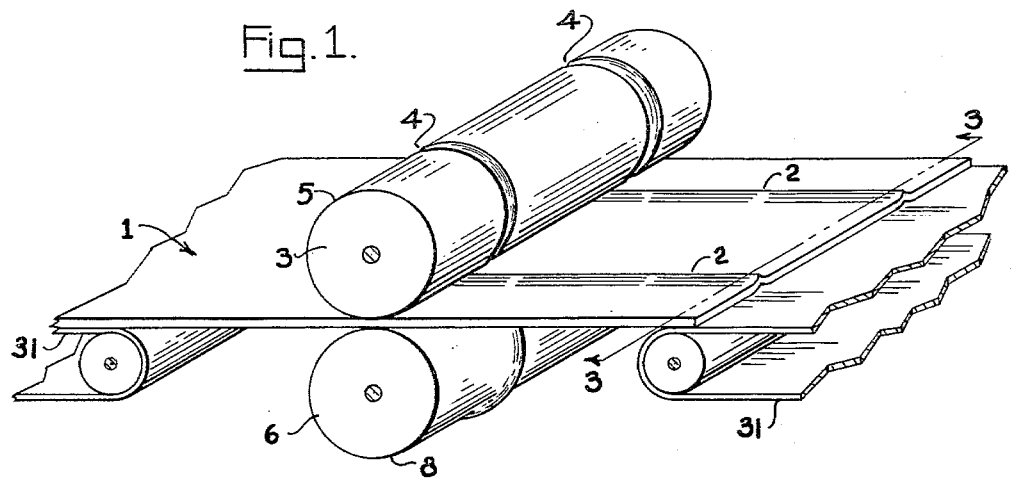
FIG. 1 depicts a wet or green asbestos-cement sheet being subjected to the action of a press or accumulator roll.

Referring to FIGS. 1–4 of the drawings, a fabricated wet asbestos-cement sheet 1 is subjected to the action of accumulator roll 3 and its opposition roll 6, which produces a plurality of crimps or undulations in the basic, planar sheet. The wet sheet may be formed either by the "dry process" or by the "wet process" for forming asbestos-cement sheets. In the dry process (also referred to as the "dry press" process), the raw materials are mixed together while in a relatively dry state. Water is added to the mixture, after being laid upon a conveyor belt 31 as a furnish, and the wet furnish is subjected to the action of a plurality of picker rolls, perforated press rolls, plain press rolls and an accumulator roll, which rolls shape the furnish on the conveyor belt into its approximate final sheet thickness. If desired, a veneer may be applied thereto, in order to impart to the sheet a uniform, finished surface. On the other hand, in the wet process, the raw ingredients are initially mixed with a large volume of water forming thereby a slurry. The solids in the slurry are deposited on the conveyor 31, usually by a vacuum transfer apparatus, and the saturated solids are thereafter subjected to the action of a plurality of perforated press rolls, plain press rolls and an accumulator roll, which also form the furnish into the final sheet thickness.

With either process, the asbestos-cement sheet, subsequent to the accumulator roll, i.e., the last forming roll, has its ingredients in an intertwined wet state, that is to say, the sheet is relatively plastic and is considered to be what is known as green or as being in the green stage with the fibers enmeshed and intertwined with the cement and silica therein. In this state, the formed sheet is sufficiently plastic so that it can be shaped satisfactorily into odd configurations, providing sharp bends, turns or corners are not made therein; at the same time, it has sufficient body, so that it can be handled without appreciable difficulty, as, for example, by transporting it on a pallet from one processing station to another.

Figure 2:
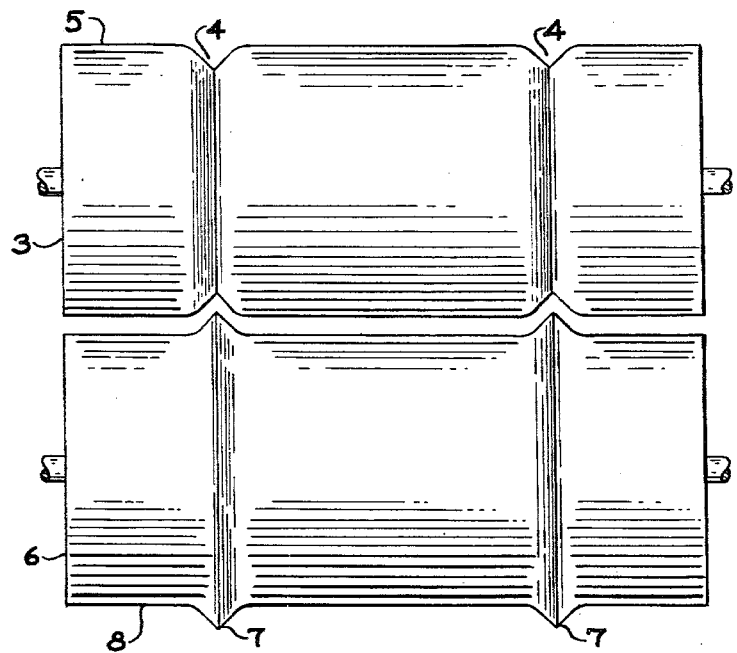
FIG. 2 is an elevation view of the accumulator roll and its opposition roll used in this invention, showing primarily the peripheral contour of the rolls which impart an initial change in configuration to the asbestos-cement sheet.

Referring to FIGS. 1 and 2, in either the dry process or the wet process the final upper roll or accumulator roll 3 of this invention has its outer peripheral surface 5 conforming to a cylinder and has a plurality of "V" type indentations 4 extending from the outer peripheral surface 5 into the body portion of the roll 3. Oppositely facing roll 6, also referred to as the opposition roll, is similar to the upper roll 3 but has a plurality of projecting undulations 7 on the outer periphery 8 of the roll, such that the undulations 7 complement the grooves 4 in the peripheral surface 5 of the opposing roll 3. The pair of rolls are rotated by any convenient, conventional power source, not shown.

Figure 4:
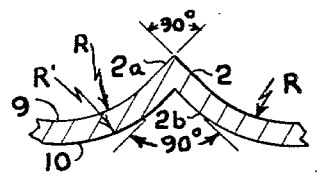
FIG. 4 is an enlarged view of a portion of the sheet shown in FIG. 3 showing in greater detail the change in contour in the asbestos-cement sheet produced by the accumulator roll.

After being subjected to the action of the accumulator roll 3 and its opposition roll 6, the wet, pressed sheet 1 has a plurality of undulations or crimps 2 on its upper surface, which extend away from the plane of the sheet. These undulations or crimps may contain sharp corners without causing the sheet to break or crack because the sheet is not subjected to bending stresses by the rolls 3 and 6, but is merely subjected to a forming operation by the last forming rolls of the asbestos-cement sheet forming machine. Referring to FIGS. 3 and 4, the crimps or undulations 2 have complementary portions 2a and 2b in the upper surface 9 and lower surface 10, respectively. At the inner and outer apex of each crimp, the angle between adjacent surfaces approximates 90° for a very short distance away from the peaks of the outer and inner apices. Another way of stating this relationship is that the included angle formed by planes tangent to the ends of the curved surfaces adjacent the peak of the crimp form an angle of 90°. It should be apparent that angles other than 90° may be formed. Of course, such angles would not include 0° or 180° since these angles would result in a flat rather than an angled or bent sheet. The rolls 3 and 6 impart to the sheet a crimp of the type wherein outer and inner radii R, R' are approximately 1″–2″ and the peak of the crimp is at a height of approximately ¼″–½″ from the surface 9 of sheet 1, depending upon the thickness of the sheet utilized. The crimps formed must conform to the basic proposition noted heretofore, that is to say, the outer and inner radii R, R' of the crimps must be at least approximately 1″, or more, in order to avoid rupturing or serious weakening of the surfaces adjacent the crimped or undulated areas upon subsequent straightening of the curved side surfaces of the crimps or undulations.

The sheet may be properly cut and trimmed into shingle sizes while on the conveyor, and each such shingle 11 is thereafter superimposed over a form or die 12 having a sharp angle bend 13 thereon (FIG. 5). The crimp 2 (shown in dotted lines), producing the initial, irregular contour in the relatively planar sheet, is, in a sense, straightened out by being pressed around the sharp angled bend 13 of the form or die 12. In being straightened out, the areas of the sheet away from the apices of the crimp, being curved, are made to conform to the outer planar surfaces 12a, 12b of the die 12. Portions of the upper and lower surfaces for a short distance away from the apices form a sharp, right angle; consequently, the lower surface 10, in the area of the surface immediately adjacent the lower apex of the crimp, follows the contour of bend 13 neatly without any subsequent change in contour. The upper surface 9, in constant parallelism with the lower surface 10, but spaced away therefrom, likewise is formed neatly to the corner. In thus straightening the crimp, no additional stress is imparted to those areas of the sheet which are shaped to effect the sharp bend or turn in the final, hardened article. In those areas of the surfaces farther away from the apices where the straightening takes place during forming around the die, any possible stresses previously imparted to the sheet are removed or at least decreased since the sheet, adjacent these areas, reverts back to its original planar form prior to the formation of the crimps.

The article formed may be further trimmed, if necessary, and removed from the die or form 12; it is then transferred to a subsequent station of the fabrication system to be either air or steam cured to harden the cementitious materials contained within the sheet. The hardened article 11a produced (FIG. 6) may be utilized as a siding shingle wherein the sharp bend in the lip 14 may be oriented on a wall so as to simulate a deep shadow effect.

The techniques of this invention may also be utilized to form other irregular shapes not contemplated before. For example, the duct 15 of FIG. 7 may be formed from a single sheet of material by shaping a green sheet of asbestos-cement, crimped at three areas instead of two, as shown in FIG. 3, around a square-type die or form whereby a plurality of sharp bends 20, 21, 22 are formed in the sheet to produce a plurality of sides, 16, 17, 18, 19, which, when correlated to each other as illustrated, form a hollow, rectangular duct. The techniques disclosed may likewise be used to form other molded asbestos-cement products of unusual cross-sectional configuration, as, for example, roof tile, gutters, troughs, and the like.

In the formation of the sharp bends (FIG. 4), the radii of curvature R, R' for forming the crimp 2 in the wet sheet 1 should be at least approximately 1″. As noted heretofore, sharp bends, produced by simple bending, having a radii smaller than 1″ produce undue stresses within the material, ultimately causing the creation of cracks in the surface of a hardened sheet. However, when the changes in contour are imparted to the wet or green sheet and are correlated to each other in the particular manner described herein, a bend is produced which from all visible aspects has a radius of curvature much smaller than 1″. Thus, for example, the radii of the inner surface and the outer surface of the formed article of FIG. 6 adjacent the inner and outer peaks of the bend or corner thereof, have the appearance of being infinitely small as the lip 14 forms a sharp right angle (90°), or thereabouts, with the plane of the main body of the formed shingle 11a.

In a sense, as evidenced by the description contained herein, the sheet is formed by an accumulator roll approximately to the shape or contour desired to be created in the planar sheet, and the forming of the sheet is subsequently finished by placing the sheet upon a die, having thereon the desired change in contour desired to be imparted, and conforming the shaped approximate contour to the finished contour on the die. However, in another sense, as in forming sharp, simple bends, for example right-angle bends, the invention comprises the forming of the bend in the planar sheet by subjecting the sheet to the pressure of an accumulator roll and subsequently straightening out curvatures, which are formed in the sheet within the radius limits noted.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. A method of creating sharp bends in green asbestos-cement sheets comprising forming a crimp in a green sheet of asbestos fiber and cement, the sides of the crimp being curved about radii of curvature of at least approximately one inch, placing the crimped sheet on a form having a bend thereon, the included angle formed by the sides of the bend being greater than 0° but less than 180°, the crimp being adjacent the bend, straightening the curved sides of the crimp, the crimped portion of the sheet conforming closely to the bend on the form, and curing the sheet so as to permanently set the sheet with the bend conforming shape therein.

2. A method of forming sharp right-angle bends in asbestos-cement sheets comprising, forming a sheet of "green" asbestos fiber and cement, forming a peaked undulation in said sheet, the undulation comprising curved sides having radii of curvature of at least approximately one inch, and the peaked portion of the undulation comprising approximately a right-angle, placing the sheet on a form having a sharp right-angle bend thereon with the peaked portion of the undulation being placed adjacent the bend, straightening the curved sides of the undulation so as to conform the peaked undulation to the right-angle bend on the form, and curing the sheet so as to set the sheet and the right-angle bend therein.

3. A method of forming a relatively thin asbestos-cement sheet into an irregular cross-sectional shape comprising forming a green, thin, planar sheet of asbestos fiber and cement, subjecting the sheet to the pressure of contoured rolls, the rolls forming a plurality of crimps extending away from the plane of the sheet, the sides of the crimps being curved about radii of curvature of at least approximately one inch, straightening the curved sides of the crimps by conforming the crimped sheet to a die having thereon the cross-sectional configuration desired to be imparted to the sheet, the configuration including sharp contour changes thereon each of which forms an angle greater than 0° but less than 180°, the crimps being superimposed over the sharp contour changes in the die, and curing the sheet.

4. A method of bending an asbestos-cement sheet comprising the steps of forming an uncured, relatively plastic asbestos-cement sheet having an undulation therein, each side of the undulation comprising a curved surface having a radius of curvature of at least approximately one inch, the included angle formed by planes tangent to the ends of the curved surfaces adjacent the peaks of the undulation being greater than 0° but less than 180°, straightening the curved side surfaces of the undulation, whereby the angle formed by the sides of the sheet substantially equals said included angle, and curing the sheet.

5. A method of bending an asbestos-cement sheet as recited in claim 4, whereby the undulation is formed by opposed rolls, one roll having a raised portion about its periphery, and the other roll having a groove corresponding substantially in size and shape to the raised portion.

6. A method of bending an asbestos-cement sheet as recited in claim 4, wherein the curved side surfaces of the undulation are straightened over a form comprising surfaces angled at substantially said included angle.

7. A method of bending an asbestos-cement sheet as recited in claim 4, wherein the peak of the undulation forms an angular configuration.

References Cited by the Examiner

UNITED STATES PATENTS

| 2,131,043 | 9/38 | Harshberger et al. | 18—60 |
| 2,431,353 | 11/47 | Varner et al. | 18—19 |
| 2,608,334 | 8/52 | Knocke. | |
| 2,862,542 | 12/58 | Norton | 156—594 |

ROBERT F. WHITE, *Primary Examiner.*

ALEXANDER H. BRODMERKEL, *Examiner.*